UNITED STATES PATENT OFFICE.

LEON J. D. HEALY AND ARTHUR A. FRANK, OF MILWAUKEE, WISCONSIN, ASSIGNORS TO THE FEDERAL RUBBER COMPANY, OF CUDAHY, WISCONSIN, A CORPORATION OF MASSACHUSETTS.

METHOD OF VULCANIZING AND MOLDING ARTICLES MADE OF RUBBER AND THE LIKE.

1,272,040.   Specification of Letters Patent.   Patented July 9, 1918.

No Drawing.   Application filed September 17, 1917.   Serial No. 191,742.

*To all whom it may concern:*

Be it known that we, LEON J. D. HEALY and ARTHUR A. FRANK, citizens of the United States, residing at Milwaukee, in the county of Milwaukee and State of Wisconsin, have invented new and useful Improvements in the Methods of Vulcanizing and Molding Articles Made of Rubber and the like, of which the following is a specification.

This invention relates to the manufacture of rubber articles and particularly to the manufacture of vehicle tires.

In the manufacture of molded rubber and rubber composition goods the raw rubber prior to vulcanization in the mold is soft and tacky. When the rubber article is placed in the mold for vulcanization the soft tacky nature of the rubber causes blisters, indentures and other disfiguring marks to appear on the finished article. This is objectionable in the manufacture of a large number of rubber articles but is particularly objectionable in the manufacture of automobile tires. The cause of the formation of the blisters and other blemishes is believed to be due to the fact that the air trapped in the mold, instead of passing over the surface of the rubber article and escaping between the mold sections, is trapped in the soft surface of the raw rubber. The formation of these disfiguring marks may also be due to the soft rubber adhering to the mold sections but this is usually guarded against by an abundant use of soapstone, etc.

It has been found that the formation of these blemishes may be practically eliminated by partially vulcanizing or curing the surface of the rubber before it is placed in the mold for final vulcanization. This makes the surface of the rubber more firm and less likely to be blemished and disfigured in the mold It has been proposed to preliminarily cure or vulcanize the surface of automobile tires by such methods as subjecting them to the action of steam before the molding operation. These methods however, are not practical because they consume a lot of time, are costly and require the use of expensive apparatus. Furthermore the preliminary heat treatment injures the surface of the rubber to such an extent that the articles have to be inspected and repaired before they are placed in the mold. This of course requires additional time and labor.

One object of this invention is to provide an improved method of vulcanizing and molding rubber articles which will not have the disadvantages above mentioned.

Other objects will appear as the specification proceeds.

The method of vulcanizing herein disclosed is applicable to all molded articles made of rubber and similar material. However, as the method has been found of particular value in the manufacture of automobile tires it will be described as applied to this particular class of articles.

The customary method of making automobile tires is to build up a fabric carcass and apply to the carcass, strips or layers of raw rubber. The tire so formed is then placed in a mold and subjected to heat and pressure to cause the rubber to flow, shape itself and be vulcanized.

According to the present method the tires with the raw rubber layers are treated chemically before they are molded. This chemical treatment partially cures or vulcanizes the surface of the tire and it is then ready to be placed directly in the mold.

The chemical treatment consists in subjecting the tire to the action of a sulfur chlorid solution. This solution may be pure sulfur chlorid or sulfur chlorid to which has been added a suitable organic volatile solvent such as gasolene, carbon bisulfid, carbon tetrachlorid or the like.

The tire may be subjected to the action of vapors from this solution or the tire may be treated with the solution itself by dipping, spraying or applying the solution with a brush. In any case the solution acts chemically upon the rubber to produce a surface curing or vulcanization.

The preferred method of procedure is to place a number of the tires in a chamber containing a steam coil or other means of heating the interior of the chamber. The solution of sulfur chlorid is placed in the chamber and the temperature in the chamber is raised to such a point that the solution readily vaporizes. A satisfactory working temperature has been found to be about 130 or 140 degrees Fahrenheit. This causes the sulfur chlorid solution to vaporize and the vapors are allowed to act upon the tire for a period of about ten minutes. At the end of this period the surface of the tire will have been partially cured or vulcanized by the action of the sulfur chlorid sufficiently to make it firm and less liable to injury in the mold during final vulcanization. The tires are then removed and placed directly in the molds for final vulcanization.

As above stated the sulfur chlorid solution may be a pure solution of sulfur chlorid, but it has been found advisable to add a volatile solvent to the sulfur chlorid so that the solution vaporizes more readily and requires less heat. The use of a solvent is further advisable because, if the material used as a solvent for the sulfur chlorid is also a rubber solvent, the results are very beneficial due to the fact that the vapors from the solvent attack the rubber just sufficiently to cause the sulfur chlorid to impregnate the rubber and be better incorporated therewith. This is true regardless of whether the vapor method is used or whether the solution is applied directly to the tire.

When the chemical treatment of the tires is completed they may be placed directly in the molds for final vulcanization. No inspection or repairing of the tires is necessary after the preliminary treatment because the preliminary treatment is essentially a cold treatment and in no way injures the tire. By cold treatment is meant that the tire is not subjected to a heat that produces vulcanization. It is true that when the vapor method is employed the tire is subjected to the heat that is used to vaporize the sulfur chlorid solution but this is not a vulcanizing heat and in no way affects the tire.

The method above described consumes but little time, is inexpensive, simple and does not require the use of expensive apparatus. When the vapor method is used a large number of tires may be treated at the same time provided the chamber is large enough to accommodate them. The time and labor required in former methods to inspect and repair the tires between the preliminary and final vulcanizing operations are entirely eliminated in the present method as the preliminary treatment in no way injures or disfigures the tires.

The combination of the steps of preliminarily treating the tires in the manner herein disclosed and then finally vulcanizing and molding the tires constitutes a thoroughly practical and commercially important method capable of producing tires that are free from blisters or disfiguring marks of any kind.

It will now be obvious that the method is applicable to all molded goods made of rubber and similar material. The method has been described in connection with the manufacture of automobile tires merely for illustrative purposes.

What we claim is:

1. The method of making articles molded from rubber or the like, which consists in producing a chemical change in the surface of the article to be molded by treating it with a chemical substance, and then molding and vulcanizing the article.

2. The method of making articles molded from rubber or the like, which consists in partially vulcanizing the surface of the article to be molded by subjecting the article to the action of an external chemical substance, and then molding and further vulcanizing the article.

3. The method of making articles molded from rubber or the like, which consists in partially vulcanizing the surface of the articles to be molded at a temperature which has no direct effect upon the vulcanizing action, and then molding and further vulcanizing the article.

4. The method of making articles molded from rubber or the like, which consists in vulcanizing the surface of the article to be molded by the action of sulfur chlorid, and then molding and further vulcanizing the article.

5. The method of making articles molded from rubber or the like, which consists in vulcanizing the surface of the article to be molded by subjecting the same to the action of a solution of sulfur chlorid, and a solvent, and then molding and further vulcanizing the article.

6. The method of making articles molded from rubber or the like, which consists in vulcanizing the surface of the article to be molded by subjecting the same to the action of a solution of sulfur chlorid and a volatile solvent, and then molding and further vulcanizing the article.

7. The improvement in the method of making vehicle tires which consists in vulcanizing the surface of the tire by subjecting the tire to the action of an external chemical substance and then molding and further vulcanizing the tire.

8. The improvement in the method of making vehicle tires which consists in partially vulcanizing the surface of the tire by the action of sulfur chlorid, and then molding and further vulcanizing the tire.

9. The method of making articles molded from rubber or the like which consists in vulcanizing the surface of the article by subjecting the article to the action of an external chemical substance and then further vulcanizing the article.

10. The method of making articles molded from rubber or the like which consists in chemically treating the surface of the article at a temperature which has no direct vulcanizing effect and then molding and vulcanizing the article.

11. The method of making articles molded from rubber or the like which consists in chemically vulcanizing the surface of the article at a temperature which has no direct effect upon the vulcanizing action and then molding and further vulcanizing the article.

In witness whereof, we have hereunto subscribed our names.

LEON J. D. HEALY.
ARTHUR A. FRANK.